(12) United States Patent
Ninagawa et al.

(10) Patent No.: US 8,582,495 B2
(45) Date of Patent: Nov. 12, 2013

(54) RELAY STATION AND RADIO COMMUNICATION RELAY METHOD

(75) Inventors: Takayasu Ninagawa, Gifu (JP); Eiji Nakayama, Osaka (JP)

(73) Assignee: Kyocera Corporation, Kyoto (JP)

( * ) Notice: Subject to any disclaimer, the term of this patent is extended or adjusted under 35 U.S.C. 154(b) by 258 days.

(21) Appl. No.: 13/060,267

(22) PCT Filed: Aug. 21, 2009

(86) PCT No.: PCT/JP2009/064680
§ 371 (c)(1),
(2), (4) Date: Feb. 22, 2011

(87) PCT Pub. No.: WO2010/024208
PCT Pub. Date: Mar. 4, 2010

(65) Prior Publication Data
US 2011/0228720 A1    Sep. 22, 2011

(30) Foreign Application Priority Data
Aug. 23, 2008 (JP) .................................. 2008-214722

(51) Int. Cl.
*H04J 3/08* (2006.01)
(52) U.S. Cl.
USPC .......................................... 370/315; 370/210
(58) Field of Classification Search
USPC ................. 370/210, 312, 229, 329–338, 480; 455/450, 422.1, 452
See application file for complete search history.

(56) References Cited

U.S. PATENT DOCUMENTS

| 2002/0013151 | A1 | 1/2002 | Saito et al. |
| 2005/0222948 | A1* | 10/2005 | Sato et al. ........................ 705/40 |
| 2006/0003703 | A1 | 1/2006 | Yahagi |
| 2006/0046643 | A1 | 3/2006 | Izumikawa et al. |
| 2007/0036071 | A1* | 2/2007 | Herdin ............................ 370/210 |
| 2008/0108355 | A1 | 5/2008 | Oleszcsuk |
| 2009/0318176 | A1 | 12/2009 | Yahagi |
| 2010/0041414 | A1 | 2/2010 | Yahagi |
| 2010/0046413 | A1 | 2/2010 | Jin et al. |

FOREIGN PATENT DOCUMENTS

| JP | 2002-033698 A | 1/2002 |
| JP | 2005-167305 A | 6/2005 |
| JP | 2006-019773 A | 1/2006 |

(Continued)

OTHER PUBLICATIONS

Japanese Office Action "Notification of Reasons for Refusal" dated Sep. 4, 2012, which corresponds to Japanese Patent Application No. 2008-214722 and is related to U.S. Appl. No. 13/060,267; with translation.

(Continued)

*Primary Examiner* — Ricky Ngo
*Assistant Examiner* — Iqbal Zaidi
(74) *Attorney, Agent, or Firm* — Studebaker & Brackett PC

(57) ABSTRACT

A relay station 130 includes a terminal communication unit 354 which performs radio communication with a base station 120, a base station communication unit which performs radio communication with one or more radio communication terminals, and a data rearrangement unit which rearranges communication data included in a communication band allocated to the radio communication terminal to a communication band allocated to the base station, and rearranges communication data included in a communication band allocated to the base station to a communication band allocated to the radio communication terminal (FIG. 5).

8 Claims, 7 Drawing Sheets

(56) References Cited

FOREIGN PATENT DOCUMENTS

| | | |
|---|---|---|
| JP | 2006-074325 A | 3/2006 |
| JP | 2006-270879 A | 10/2006 |
| JP | 2008-017397 A | 1/2008 |
| JP | 2008-118659 A | 5/2008 |
| JP | 2008-141258 A | 6/2008 |
| JP | 2008-177969 A | 7/2008 |
| WO | 2007/069848 A2 | 6/2007 |
| WO | WO2007069848 * | 6/2007 |

OTHER PUBLICATIONS

WiMAX Forum; "Mobile WiMAX—Part 1: A Technical Overview and Performance Evaluation" Feb. 21, 2006.

* cited by examiner

RELAY STATION AND RADIO COMMUNICATION RELAY METHOD

TECHNICAL FIELD

The present invention relates to a relay station capable of relaying radio communication between a radio communication terminal and a base station, and a radio communication relay method.

BACKGROUND ART

In recent years, radio communication terminals such as PHSs (Personal Handy phone System), portable telephones, and the like have been widely available, and it has been possible to make calls or obtain information anywhere and anytime. In particular, lately, as an amount of available information has shown steady growth, high speed and high quality radio communication systems have been introduced to download a large amount of data.

As one of the high-speed digital radio communication systems, there is an OFDMA (Orthogonal Frequency Division Multiplex Access) system such as IEEE802.11 or WiMAX (e.g., "Mobile WiMAX-Part I: A Technical Overview and Performance Evaluation" prepared on Behalf of the WiMAX Forum, Feb. 21, 2006). The OFDMA system is one of data multiplexing systems, which effectively uses a frequency band by using a plurality of carriers on a unit time axis and making phases of signal waves orthogonal between adjacent carriers to partially overlap bands of the carriers. In addition, compared to an OFDM (Orthogonal Frequency Division Multiplexing) system, which assigns sub-channels in time division to individual users, the OFDMA system allows a plurality of users to share all sub-channels and assigns sub-channels having the highest transmission efficiency to each user.

If the above-described next-generation high-speed radio communication method, such as WiMAX, uses high frequency range of 2.5 GHz or higher, communication coverage for one base station is reduced in an area where the radio wave state is poor due to many obstacles or other causes. Thus, in order to cover all environments, a plurality of base stations need to be installed. In addition, since detouring of radio waves is suppressed, it is highly likely that the inside of a building is out of the communication coverage.

Accordingly, the technology for reducing a range of a service area, where communication with a base station is not available due to an effect of shadowing, which occurs from hiding by obstacles such as a building, or other causes, by installing a relay device for relaying the base station and a radio terminal device is disclosed (e.g., Japanese Patent Application Publication No. 2006-74325). In addition, the technology for scheduling frames in case of multi-hops of the relay station is disclosed (e.g., Japanese Patent Application Publication No. 2008-118659).

The relay station is installed and fixed in a building or a tower, and furthermore, may be installed in moving objects, into which a person can take, such as buses or subways. The relay station installed in a moving object is capable of maintaining the relative position relationship to a radio communication terminal, so that stable communication of the radio communication terminal can be secured.

SUMMARY OF THE INVENTION

Problems to be Solved by the Invention

The relay station performs radio communication with a base station in the same sequence as that of a radio communication terminal. Accordingly, a radio communication system (network) recognizes the relay station as a radio communication terminal. As such, it has been not possible to enable the radio communication system to recognize a radio communication terminal, which is performing radio communication with the relay station, i.e., a radio communication terminal, which is not performing radio communication directly with the base station. In order to enable the radio communication system to recognize a radio communication terminal under the relay station, the relay station requires a special configuration, for example, for performing encapsulation of communication data transmitted between the relay station and the radio communication system. This special configuration causes difficulty in quickly determining the connection number of radio communication terminals. Further, since the base station cannot see contents of the capsule, processes in the radio communication system become complicated.

The present invention has been made in consideration of the above problem, and an object is to provide a relay station and a radio communication relay method, in which despite a radio communication terminal through the relay station, it is possible to enable a radio communication system to recognize the radio communication terminal as in direct communication, so that it is possible to properly perform radio communication with the radio communication terminal.

Means for Solving the Problems

A relay station according to an embodiment of the present invention is capable of relaying radio communication between a radio communication terminal and a base station and includes: a terminal communication unit which performs radio communication with the base station; a base station communication unit which performs radio communication with one or more radio communication terminals; and a data rearrangement unit which rearranges communication data included in a communication band allocated to the radio communication terminal in a communication band allocated to the base station, and rearranges communication data included in a communication band allocated to the base station in a communication band allocated to the radio communication terminal.

A radio communication relay method according to another embodiment of the present invention is for relaying radio communication between a radio communication terminal and a base station and includes: performing radio communication with the base station; performing radio communication with one or more radio communication terminals, rearranging communication data included in a communication band allocated to the radio communication terminal in a communication band allocated to the base station, and rearranging communication data included in a communication band allocated to the base station in a communication band allocated to the radio communication terminal.

A relay station according to another embodiment of the present invention is capable of relaying radio communication between a radio communication terminal and a base station and includes: a terminal communication unit which performs radio communication with the base station, and a base station communication unit which performs radio communication with a plurality of radio communication terminals, wherein the base station communication unit allocates a communication band such that a sum of transmission capacities for the plurality of radio communication terminals performing communication therewith becomes equal to a communication capacity of a communication band allocated between the terminal communication unit and the base station.

Effect of the Invention

As described above, according to an embodiment of the present invention, despite a radio communication terminal through a relay station, it is possible to enable a radio communication system to recognize the radio communication terminal as in direct communication, so that it is possible to properly perform radio communication with the radio communication terminal.

DESCRIPTION OF EMBODIMENTS

Figure 1:
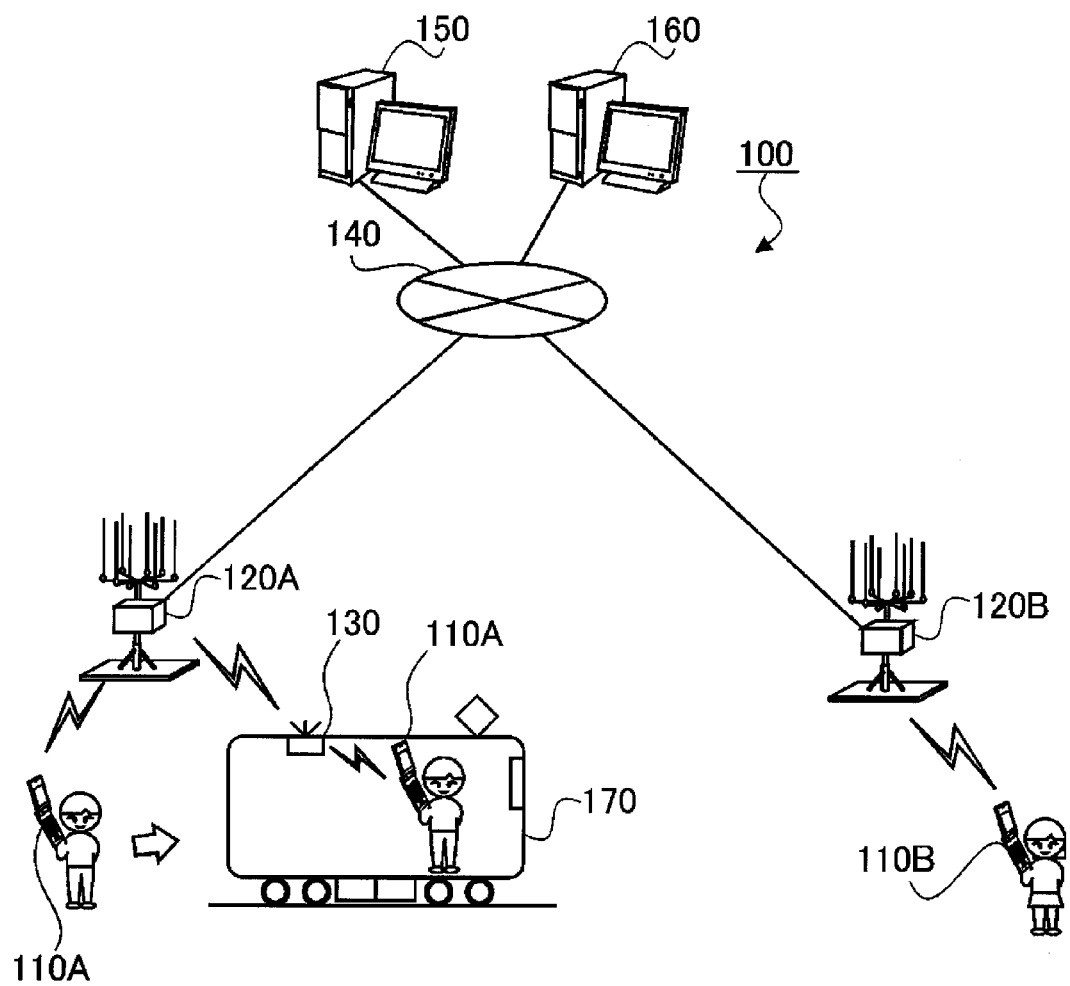
FIG. 1 is a block diagram showing general configuration of a radio communication system.

Hereinafter, a preferable embodiment of the present invention will be described in detail, with reference to the accompanying drawings. In such an embodiment, dimensions, materials, and other particular numerical values, etc., are merely exemplary to facilitate understanding of the invention and should not be construed as limiting the present invention thereto unless otherwise expressly described herein. Meanwhile, in this specification and the drawings, components having substantially the same function and configuration are denoted by the same reference numeral to omit repeated explanation, and components having no direct relation with the present invention are not illustrated.

A radio communication terminal, such as a portable telephone, a PHS terminal, and the like, configures a broadband radio communication system together with a plurality of base stations, and performs communication with another radio communication terminal or a server on a communication network through the radio communication system. In the next-generation high-speed communication method such as WiMAX, in order to avoid reduction of a communication coverage, a relay station functioning as a base station is provided in a place where the radio wave state is poor due to densification of buildings, or a moving object, in which the radio wave state remarkably fluctuates, to act as a part of the radio communication system.

Herein, in order to facilitate understanding of the embodiment of the present invention, general configuration of a radio communication system as a whole including a relay station will be described, and then, detailed operation of each of apparatus configuring the radio communication system will be described.

(Radio Communication System 100)

FIG. 1 is a block diagram showing general configuration of a radio communication system 100. The radio communication system 100 is configured by a radio communication terminal 110 (110A, 110B), a base station 120 (120A, 120B), a relay station 130, a communication network 140 including an ISDN (Integrated Services Digital Network) line, Internet, and a private line, and the like, a relay server 150, and an authentication server 160.

Herein, for the radio communication terminal 110, various electronic devices capable of performing radio communication, such as portable telephones, PHS terminals, note-type personal computers, PDAs (Personal Digital Assistant), digital cameras, music players, car navigators, portable televisions, game devices, DVD players, and remote controllers, may be used.

The authentication server 160 performs authentication (AAA: Authentication, Authorization, Accounting) for the radio communication terminal 110 according to an authentication and security sequence. For the authentication and security sequence, EAP-TTLS (Extensible Authentication Protocol-Tunneled Transport Layer Security) or EAP-TLS (Extensible Authentication Protocol-Transport Layer Security) in IEEE802.1x is used.

In the radio communication system 100 described above, when a user performs communication from his/her radio communication terminal 110A to another radio communication terminal 110B, the radio communication terminal 110A makes a radio connection request to the base station 120A, which lies within the communication coverage. Upon receiving the radio connection request, the base station 120A makes a request for communication connection to a communication counterpart, to the relay server 150 through the communication network 140. In accordance with the request, the relay server 150 extracts the base station 120B, which lies within the radio communication coverage of the radio communication terminal 110B, by reference to position registration information of the radio communication terminal 110B, and thereby securing a communication path between the base station 120A and the base station 120B. In this manner, communication between the radio communication terminal 110A and the radio communication terminal 110B is performed.

If the user gets on a subway, which is an example of a moving object 170, the radio communication terminal 110A is changed to perform indirect communication through the relay station 130, from direct communication with the base station 120A. The relay station 130 is fixed in the moving object 170 to move together with the moving object 170, thereby extending the coverage even to the inside of the moving object. As the moving object 170, various vehicles, on which a person can take, such as cars, buses, subways (trains), vessels, and airplanes can be applied.

The radio communication terminal 110A of the user who is in the moving object and the relay station 130 move together with each other without changing the relative position relationship unless the user performs an act such as looking for an unoccupied seat. Further, since there is no obstacle hiding them, it is possible to secure stable radio communication. Accordingly, regardless of movement of the moving object 170, the radio communication terminal 110A can stably keep communication with the radio communication terminal 110B through the relay station 130.

In this case, the relay station 130 installed in the moving object 170 performs communication establishment to the base station 120A in the same sequence as that of the radio communication terminal 110. As such, the radio communication system 100 recognizes the relay station 130 as the radio communication terminal 110. However, the radio communication terminal 110A, which is performing radio communication with the relay station 130, is not performing radio communication directly with the base station 120. Accordingly, the radio communication system 100 does not recognize the radio communication terminal 110A. In this embodiment, even the radio communication terminal 110 through the relay station 130, by enabling the radio communication system 100 to recognize the radio communication terminal 110 as in direct communication, it is possible to properly perform communication with the radio communication terminal 110.

Hereinafter, the radio communication terminal 110, the base station 120, and the relay station 130, which configure the radio communication system 100, will be individually described.

(Radio Communication Terminal 110)

Figure 2:
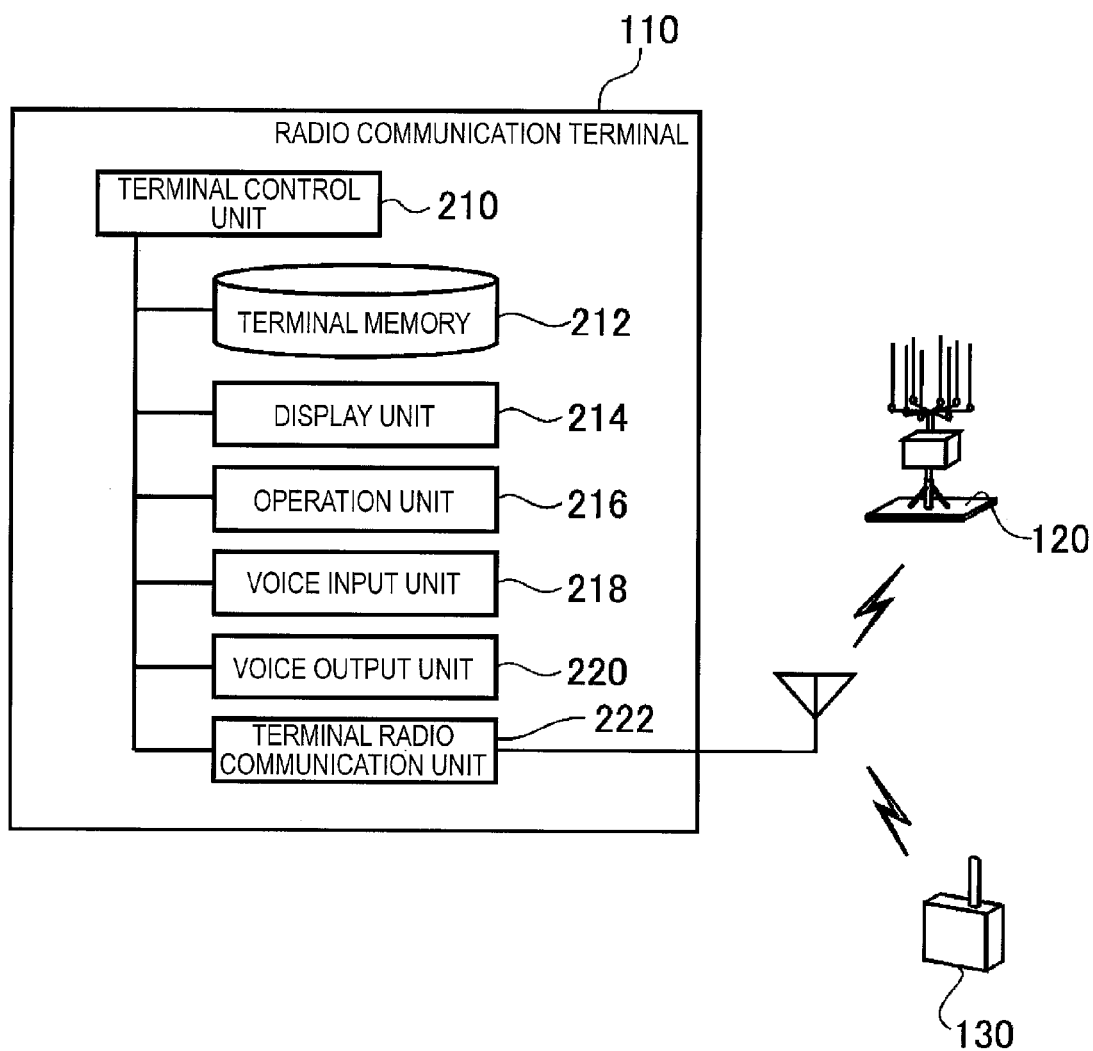
FIG. 2 is a functional block diagram showing hardware configuration of a radio communication terminal.
Figure 3:
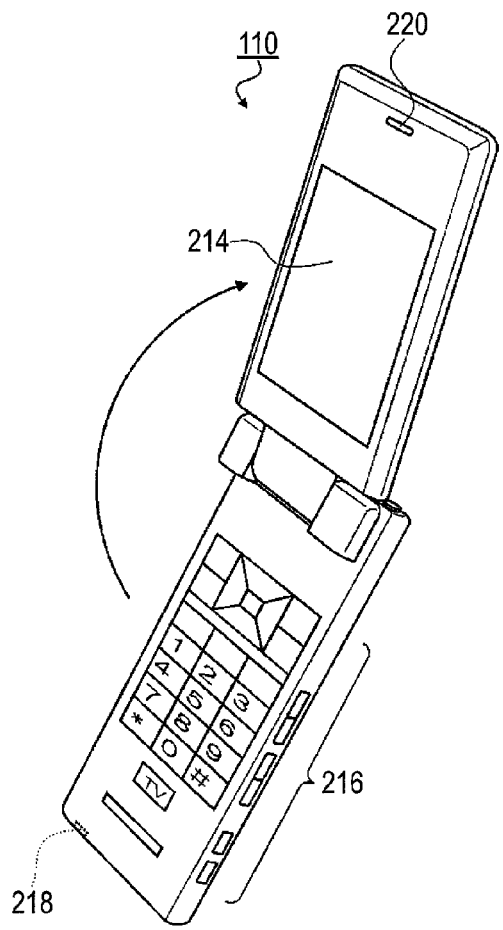
FIG. 3 is a perspective view showing the outer appearance of a radio communication terminal.

FIG. 2 is a functional block diagram showing hardware configuration of the radio communication terminal 110. FIG. 3 is a perspective view showing the outer appearance of the radio communication terminal 110. The radio communication terminal 110 is configured by a terminal control unit 210, a terminal memory 212, a display unit 214, an operation unit 216, a voice input unit 218, a voice output unit 220, and a terminal radio communication unit 222.

The terminal control unit 210 manages and controls the radio communication terminal 110 as a whole by means of a semiconductor integrated circuit including a central processing unit (CPU). The terminal control unit 210 also performs call function, mail transmitting and receiving function, imaging function, music playing function, and TV viewing function, by using programs of the terminal memory 212. The terminal memory 212 is configured by ROM, RAM, EEPROM, non-volatile RAM, flash memory, HDD, and so on, and stores programs processed in the terminal control unit 210, voice data, or others.

The display unit 214 is configured by a liquid crystal display, an EL (Electro Luminescence) display, or the like, and can display Web contents or GUI (Graphical User Interface) of application, stored in the terminal memory 212 or provided from an application relay server (not illustrated) through the communication network 140. The operation unit 216 is configured by switches such as a keyboard, a cross key, and a joystick, and accepts user's operation input.

The voice input unit 218 is configured by voice recognition means such as a microphone, and converts user's voice input during call into an electric signal, which can be processed in the radio communication terminal 110. The voice output unit 220 is configured by a speaker and converts call counterpart's voice signal received in the radio communication terminal 110 into voice to output it. The voice output unit 220 can output ringtones, operation sound of the operation unit 216, and alarm sound, etc. The terminal radio communication unit 222 performs radio communication with the base station 120 or the relay station 130 in the communication network 140. The terminal radio communication unit 222 may employ various radio communication methods such as the OFDM system and the OFDMA system.

(Base Station 120)

Figure 4:
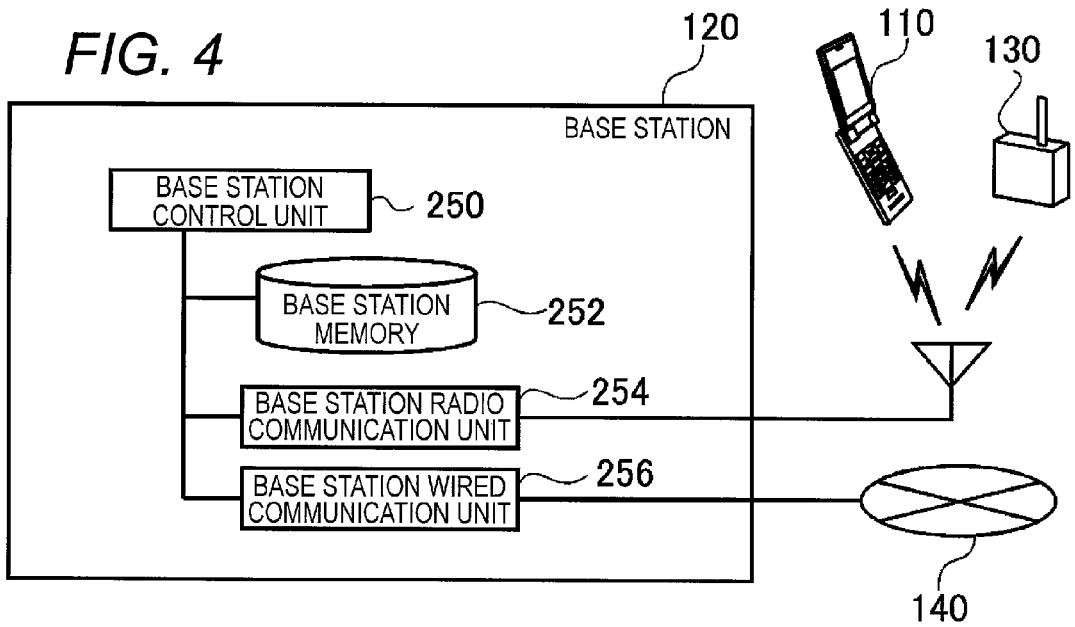
FIG. 4 is a block diagram showing general configuration of a base station.

FIG. 4 is a block diagram showing general configuration of the base station 120. The base station 120 is configured by a base station control unit 250, a base station memory 252, a base station radio communication unit 254, and a base station wired communication unit 256.

The base station control unit 250 manages and controls the base station 120 as a whole by means of a semiconductor integrated circuit including a central processing unit (CPU). The terminal memory 252 is configured by ROM, RAM, EEPROM, non-volatile RAM, flash memory, HDD, and so on, and stores programs processed in the base station control unit 250 or others.

The base station radio communication unit 254 performs radio communication with the radio communication terminal 110 or the relay station 130, for example, through the OFDMA system. The base station radio communication unit 254 may adaptively change QoS in accordance with the state of communication with the radio communication terminal 110 or the relay station 130 (adaptive modulation). The base station wired communication unit 256 can connect various servers including the relay server 150 through the communication network 140.

(Relay Station 130)

Figure 5:
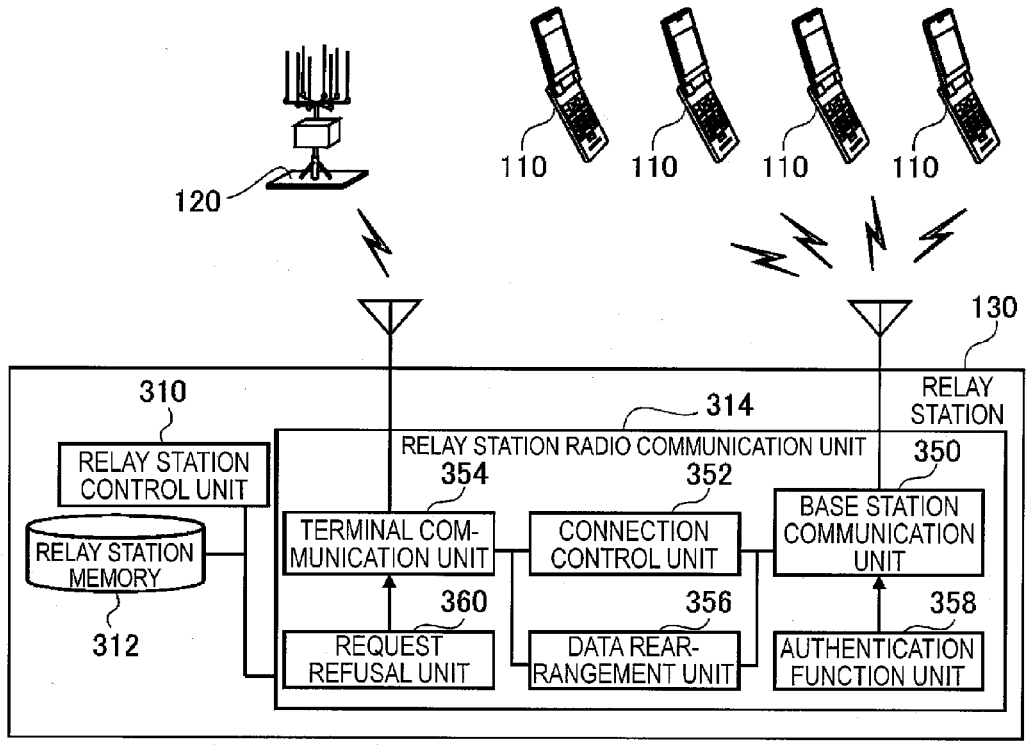
FIG. 5 is a block diagram showing general configuration of a relay station.

FIG. 5 is a block diagram showing general configuration of the relay station 130. The relay station 130 is configured by a relay station control unit 310, a relay station memory 312, and a relay station radio communication unit 314. The relay station 130 may be installed in the moving object 170, as well as a building or a tower.

The relay station control unit 310 manages and controls the relay station 130 as a whole by means of a semiconductor integrated circuit including a central processing unit (CPU). The relay station memory 312 is configured by ROM, RAM, EEPROM, non-volatile RAM, flash memory, HDD, and so on, and stores programs processed in the relay station control unit 310, or others. The relay station radio communication unit 314 performs radio communication with the radio communication terminal 110 and the base station 120, to relay the radio communication terminal 110 and the base station 120. The relay station radio communication unit 314 also functions as a base station communication unit 350, a connection control unit 352, a terminal communication unit 354, a data rearrangement unit 356, an authentication function unit 358, and a request refusal unit 360.

The base station communication unit 350 functions as a base station for communication with the radio communication terminal 110, and acts as a physical layer (layer 1) and a data link layer (layer 2) in the OSI reference model. As shown in FIG. 5, basically, only one base station communication unit 350 is installed for one relay station. For application to a somewhat large space such as a vessel and an airplane, a plurality of base station communication units 350 may be configured. By virtue of the base station communication unit 350, even if the radio communication terminal 110 performs radio communication with the relay station 130 not the base station, the radio communication terminal 110 operates as if it performs radio communication with the base station 120.

If a plurality of radio communication terminals 110 are connected to the base station communication unit 350, the connection control unit 352 performs control of channels (MAC tracer function). The connection control unit 352 may adaptively change QoS, in accordance with the state of communication with the radio communication terminal 110, which is performing radio communication with the base station communication unit 350 (adaptive modulation).

The terminal communication unit 354 functions as the radio communication terminal 110 for communication with the base station 120, and acts as a physical layer and a data link layer in the OSI reference model. In this embodiment, since radio communication with the base station 120 uses the OFDMA system, even in the case where the base station communication unit 354 described above is capable of performing radio communication with a plurality of radio communication terminals 110, the single terminal communication unit 354 (RF circuit) can receive all the radio communications with the base station 120. This is because a resource of the single terminal communication unit 354 can handle the communications of the plurality of radio communication terminals 110 while being divided in a time direction and a frequency band direction.

In this embodiment, only one terminal communication unit 354 is provided based on the OFDMA system. However, the present invention is not limited to the embodiment. In the OFDMA system and other communication systems, it is possible to provide a plurality of terminal communication units 354. If a plurality of terminal communication units 354 are provided, each of the terminal communication units 354 can independently perform communication with a different base station 120.

The terminal communication unit 354 performs radio communication with the radio communication terminal 110 while distributing an amount of a communication band equal to that of a communication band secured by establishment of radio communication with the base station 120 through the terminal communication unit 354.

Figure 6:
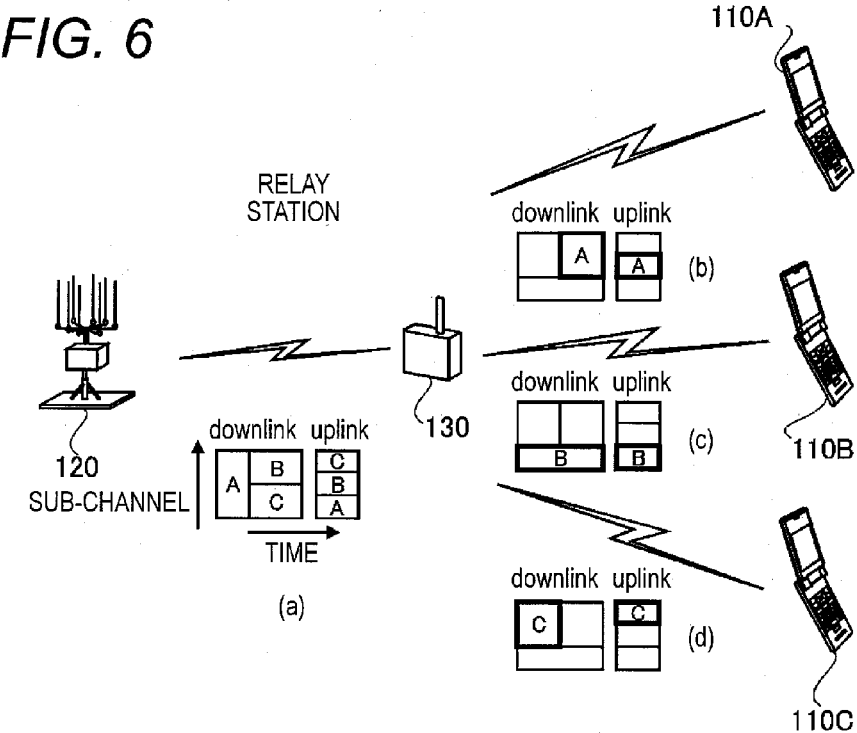
FIG. 6 is an explanation view to explain securing a communication band by a terminal communication unit.

FIG. 6 is an explanation view to explain securing a communication band through the terminal communication unit 354. For example, if three radio communication terminals 110A, 110B, and 110C make a communication request to the relay station 130 sequentially, the terminal communication unit 354 of the relay station 130 makes a request for allocation of communication bands to the radio communication system 100. As shown in (a) of FIG. 6, the terminal communication unit 354 secures a communication band A for the radio communication terminal 110A, a communication band B for the radio communication terminal 110B, and a communication band C for the radio communication terminal 110C in a same channel. The base station communication unit 350 allocates communication bands of the radio communication terminals 110A, 110B, and 110C as shown in (b), (c), and (d) of FIG. 6, respectively, to have the same transmission capacity as that of the secured communication bands. In this manner, transparent transmission (transmission, which does not accompany alteration of effective data) between the base station 120 and the radio communication terminal 110 can be realized.

In this case, arrangement of the communication bands A, B, and C allocated to the base station 120 as shown in (a) of FIG. 6 is different from arrangement of the communication bands A, B, and C allocated to the radio communication terminals 110A, 110B, and 110C as shown in (b), (c), and (d) of FIG. 6. This is because optimum base band arrangements are different due to a difference in a communication environment between the base station 120 and the relay station 130 and between the relay station 130 and the radio communication terminals 110.

That is, by securing at least the same transmission capacity as a sum (adding up) of transmission capacities of communication bands allocated to communication with the radio communication terminals 110, for a communication band allocated to communication with the base station 120, even without changing contents of communication data (effective data) transmitted from the radio communication terminals 110 or the base station 120 to the relay station 130, it is possible to transparently transmit the communication data to the base station 120 or the radio communication terminals 110. Accordingly, even the radio communication terminal 110 through the relay station 130, it is possible to enable the radio communication system 100 to recognize the radio communication terminal 110 as in direct communication, so that it is possible to properly perform communication with the radio communication terminal 110.

Specifically, in an uplink, a transmission capacity of a communication band allocated to communication with the base station 120 should be more than a sum of transmission capacities of communication bands allocated to communication with the radio communication terminals 110. In a downlink, a sum of transmission capacities of communication bands allocated to communication with the radio communication terminals 110 should be more than a transmission capacity of a communication band allocated to communication with the base station 120.

The data rearrangement unit 356 rearranges communication data included in a communication band allocated to the radio communication terminal 110 in a communication band allocated to the base station 120. The data rearrangement unit 356 also rearranges communication data included in a communication band allocated to the base station 120 in a communication band allocated to the radio communication terminal 110. According to this configuration, it is possible to transparently transmit communication data from the radio communication terminal 110 to the base station even without changing contents of the communication data. Also, it is possible to transparently transmit communication data from the base station 120 to the radio communication terminal 110.

Figure 7:
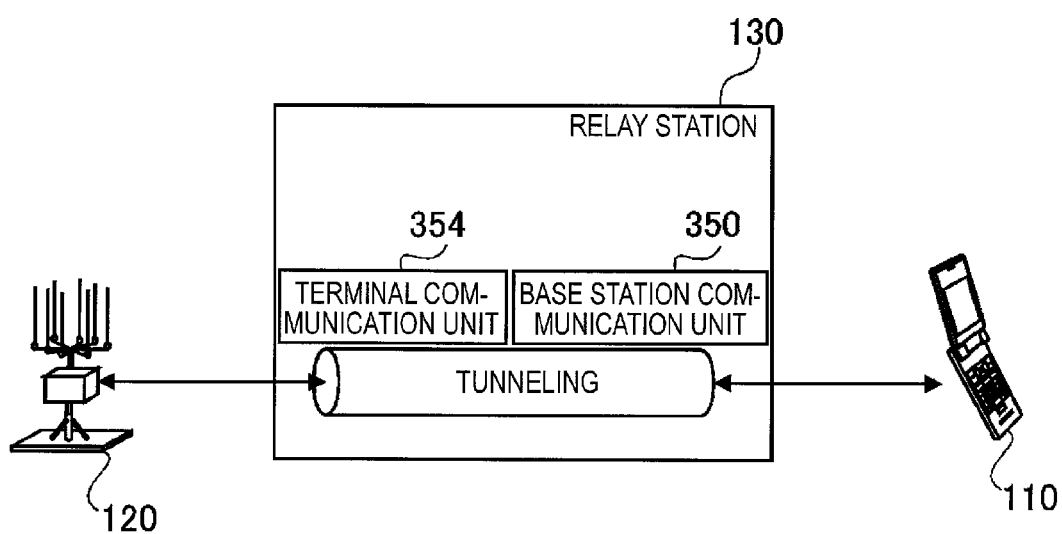
FIG. 7 is an explanation view to generally explain transmitting and receiving communication data.
Figure 7:
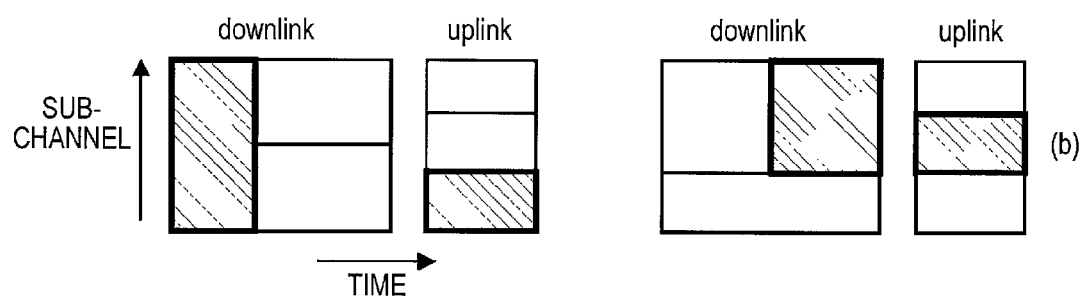

FIG. 7 is an explanation view to generally explain configuration of transmitting and receiving communication data. Conventionally, the relay station 130 is recognized as the radio communication terminal 110. However, since the radio communication terminal 110 under the relay station cannot be recognized, the relay station 130 performs encapsulation of communication data with the radio communication terminal 110. In this embodiment, the data rearrangement unit 356 has a function of tunneling (transparent transmission) an MAC message extracted in radio communication between the radio communication terminal 110 and the base station communication unit 350, from the terminal communication unit 354 to the base station 120.

Accordingly, it is possible for the terminal communication unit 354 to perform position registration with the base station 120 based on an original terminal ID of the radio communication terminal 110. Specifically, the base station communication unit 350 extracts terminal information (MAC address, IP address, and position registration information) of the radio communication terminal 110 from the MAC message provided upon establishment of communication with the radio communication terminal 110. By using the original information (e.g., a terminal ID), the terminal communication unit 354 performs position registration with the base station 120 (radio communication system 100) as if it is the radio communication terminal 110. Especially, in case of transmitting terminal information to the relay station 150 of the radio communication system 100, or in case of actually transmitting and receiving communication data, data are transparently transmitted as they are.

However, as described above, an environment of communication between the base station 120 and the relay station 130, and an environment of communication between the relay station 130 and the radio communication terminal 110 are different, so that arrangements of radio bands are different. That is, optimum arrangement of radio bands is selected on a moment by moment basis.

The authentication function unit 358 functions as an authentication server 160 having an ID or a certification required to authenticate the radio communication terminal 110. By using the EAP-TTLS or EAP-TLP method, the authentication function unit 358 decrypts encrypted communication data from the base station 120 and encrypt the decrypted data into communication data, which can be transmitted to the radio communication terminal 110, and decrypts encrypted communication data from the radio communication terminal 110 and encrypts the decrypted data into communication data, which can be transmitted to the base station 120. An encryption key used for the encryption is changed in a predetermined cycle, for example, per 30 seconds, thereby increasing the security.

An appropriate QoS is applied to the communication path between the base station 120 and the terminal communication unit 354, and the communication path between the base station communication unit 350 and the radio communication terminal 110, in accordance with the radio wave environment. Accordingly, when communication data are transmitted over the two communication paths, data format conversion between different QoSs needs to be performed. For example, if 256 QAM (Quadrature Amplitude Modulation), 64 QAM, 16 QAM, QPSK (Quadrature Phase Shift Keying), and BPSK (Binary PSK) are adopted as QoSs having different modulation methods, communication speeds, and codecs, the QoSs have different packet lengths depending on the communication speeds, thereby requiring conversion of data format.

If the authentication server 160 is adopted in the radio communication system 100, the relay station 130 should decrypt the communication data once to perform the data format conversion. For example, in the embodiment described above, each of the QoSs has a different length. However, basically, encryption by the authentication server 160 is performed in a packet unit. Thus, after the decryption, processes for reforming the packet length and performing encryption are necessary. In this embodiment, by providing the authentication function unit 358 functioning as an authentication server in the self-station, it is possible to re-encrypt communication data after the data format conversion. Accordingly, it is possible to properly perform communication of the radio communication terminal 110, without performing particular processes in the radio communication terminal 110.

When the base station 120 makes a handover request to the radio communication terminal 110 performing radio communication with the base station communication unit 350, the request refusal unit 360 does not transfer the handover request to the radio communication terminal 110, and makes a response indicating that the handover is not performed to the base station 120.

There is a case where when the number of the radio communication terminals 110 is concentrated toward a resource, or due to other cases, the base station 120 prompts handover on the radio communication terminals 110 (handover request). However, since the radio communication terminals 110 are actually under the relay station 130, they should not simply accept the handover. Further, in view of the reason for the existence of the relay station 130, i.e., coverage securing, communication between the radio communication terminals 110 and the relay station 130 can be regarded as being stable. Accordingly, in this embodiment, the radio communication terminals 110 under the relay station 130 obstinately avoid the handover.

According to this configuration, the relay station 130 does not need to respond to the current base station 120 and the base station 120, which is the handover destination, at the same time, thereby avoiding increase of process load and increase of hardware costs resulting from adopting a plurality of high-cost RF circuits.

By virtue of the relay station 130 described above, even the radio communication terminal 110 through the relay station 130, it is possible to enable the radio communication system 100 to recognize the radio communication terminal 110 as in direct communication, so that it is possible to properly perform communication with the radio communication terminal 110. Meanwhile, since it is possible to enable the recognition by the radio communication system 100 as in direct communication, the relay station 130 does not require a special configuration for managing the relay station 130 to perform communication with the radio communication terminal 110.

(Radio Communication Relay Method)

Subsequently, a radio communication relay method for performing radio communication by using the radio communication terminal 110, the base station 120, and the relay station 130 will be described in detail.

In the radio communication relay method, for processes such as communication requesting (ranging) or data channel establishment (service flow establishment), which do not require access to core network units such as the relay server 150 of the radio communication system 100, the communication path between the base station 120 and the terminal communication unit 354, and the communication path between the base station communication unit 350 and the radio communication terminal 110 are operated independently (in the closed state).

However, for processes such as notification of terminal capability (SBC-REQ (Subscriber Station Basic Capability Request)) or notification of terminal position registration (REG-REQ (Registration Request)), which require access to core network units such as the relay server 150 of the radio communication system 100 by using unique information (MAC address, and others) of the radio communication terminal 110, the base station communication unit 350 acquires terminal information from the MAC message received from the radio communication terminal 110 during radio communication, and transparently transmits the information to the terminal communication unit 354. Hereinafter, the case where the communication path between the base station 120 and the terminal communication unit 354, and the communication path between the base station communication unit 350 and the radio communication terminal 110 are independently operated, and the case of the transparent transmission will be described in detail.

Figure 8:
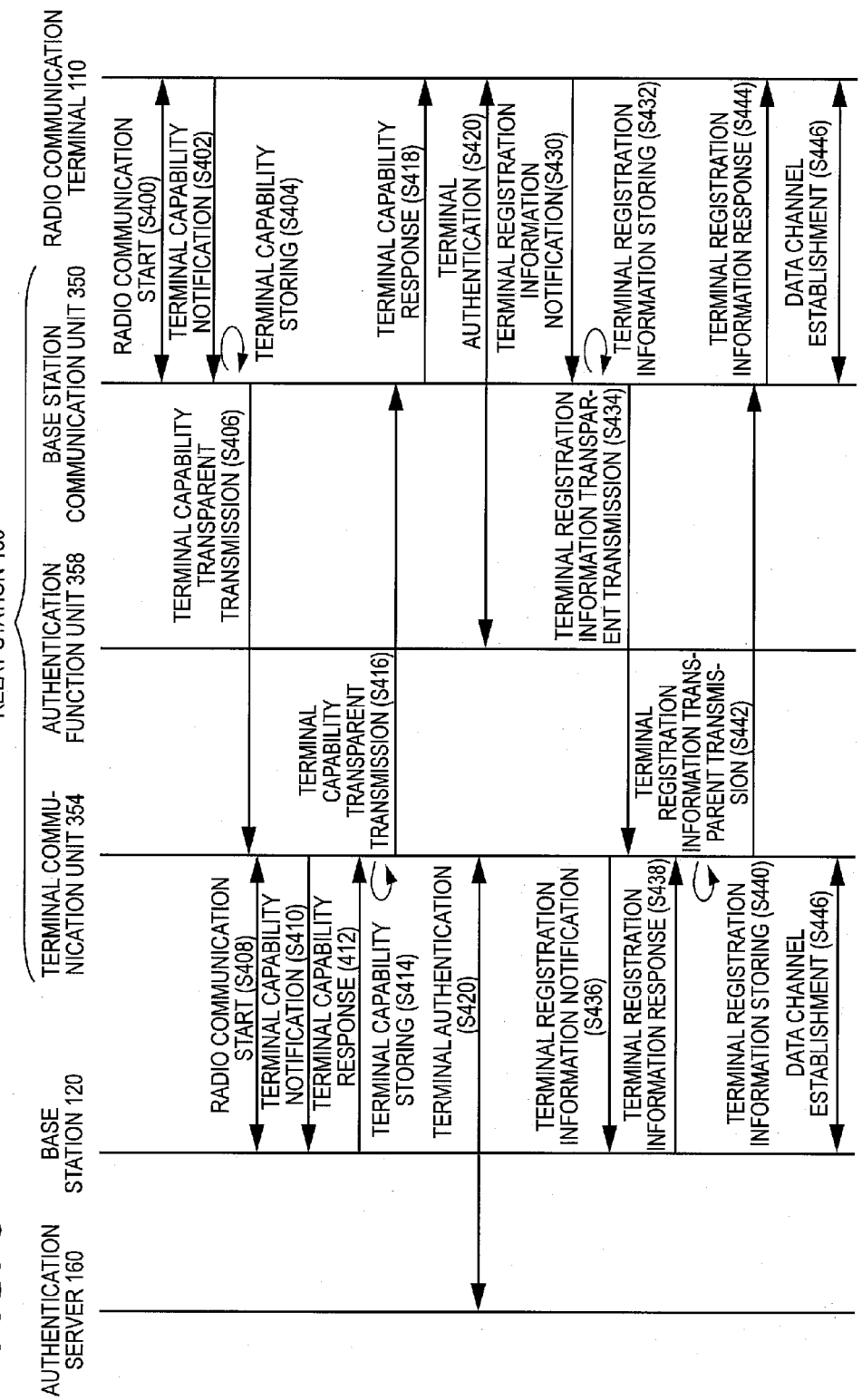
FIG. 8 is a sequence view to explain processes for radio establishment between a radio communication terminal and a relay station.

FIG. 8 is a sequence view to explain processes for radio establishment between the radio communication terminal 110 and the relay station 130. When the radio communication terminal 110 makes a communication request to the relay station 130 based on results of a carrier sense, radio communication is started through the closed communication path between the base station communication unit 350 and the radio communication terminal 110 (S400).

Subsequently, when the radio communication terminal 110 performs notification of terminal capability (SBC-REQ), which requires access to the relay server 150, the radio communication terminal 110 notifies the terminal capability to the base station communication unit 350 (S402). The base station communication unit 350 stores the terminal capability (S404), and transparently transmits the information to the terminal communication unit 354 (S406). The terminal communication unit 354 receives the terminal capability to start radio communication with the base station 120, and notifies the terminal capability to the base station 120 (S410).

The terminal communication unit 354 receives a response to the terminal capability (SBC-RSP) from the radio communication system 100 (S412), stores the terminal capability, to which the response has been made (S414), and transparently transmits the terminal capability to the base station communication unit 350 (S416). The base station communication unit 350 makes a terminal capability response to the radio communication terminal 110 (S418). In this manner, the base station 120 and the radio communication terminal 110 can perform setting of terminal capability as if they are directly communicating with each other.

Subsequently, the authentication server 160 authenticates the radio communication terminal 110, which is a transmission counterpart. Specifically, the authentication server 160 authenticates the terminal communication unit 354 of the relay station 130 as the radio communication terminal 110, whereby the authentication function unit 358 authenticates the radio communication terminal 110 (S420).

When the radio communication terminal 110 performs notification of terminal registration information (REG-REQ), the radio communication terminal 110 notifies the terminal registration information to the base station communication unit 350 (S430). The base station communication unit stores the terminal registration information (S432), and transparently transmits the information to the terminal communication unit 354 (S434). The terminal communication unit 354 notifies the terminal registration information to the base station 120 (S436), receives a response to the terminal registration information (REQ-RSP) from the radio communication system 100 (S438), stores the terminal registration information, to which the response has been made, (S440), and transparently transmits the information to the base station communication unit 350 (S442). The base station communication unit 350 makes a terminal registration information response to the radio communication terminal 110 (S444).

Once the terminal registration is performed in this manner, a data channel is established in each of the communication path between the base station 120 and the terminal communication unit 354, and the communication path between the base station communication unit 350 and the radio communication terminal 110 (S446).

In this case, the base station communication unit 350 transparently transmits the communication data acquired from the terminal communication unit 354 to the radio communication terminal 110. However, for functions, which the base station communication unit 350 does no support, e.g., high-speed handover, bean forming, QoS, or ID, which cannot be transparently used as it is, the base station communication unit 350 determines the contents by itself and properly corrects the message contents to transmit them to the radio communication terminal 110.

Figure 9:
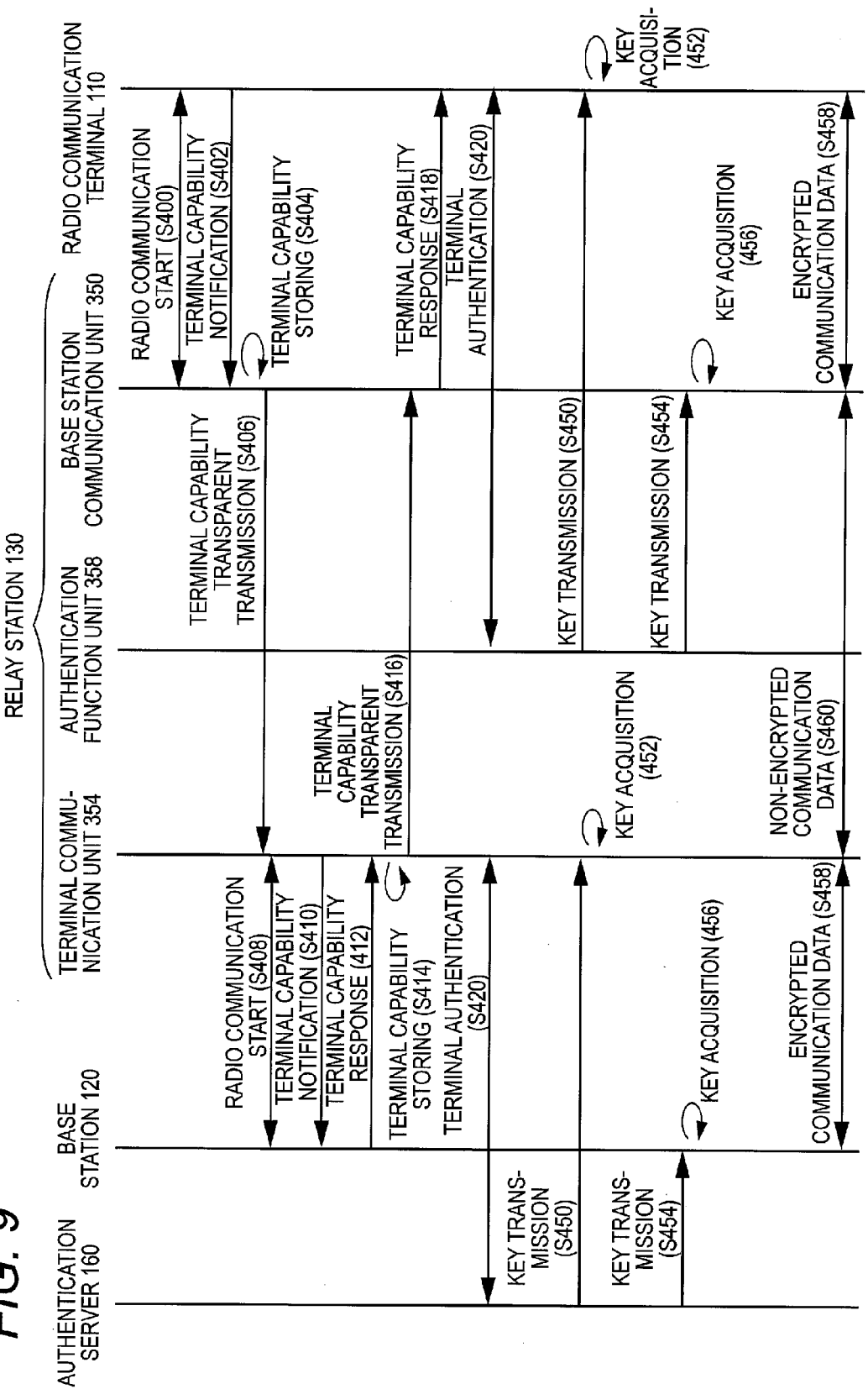
FIG. 9 is a sequence view to explain a flow of communication data by encrypted communication data.

FIG. 9 is a sequence view to explain flow of communication data by encrypted communication data. The operations until the terminal authentication (S420) in FIG. 9 are substantially the same as those in FIG. 8. Thus, the same reference numerals as used in FIG. 8 will be used herein to omit explanation of the operations.

Once the terminal authentication (S420) is finished in the communication path between the base station 120 and the terminal communication unit 354, and the communication path between the base station communication unit 350 and the radio communication terminal 110, each of the authentication server 160 and the authentication function unit 358 generates an encryption key and a decryption key, and transmits the keys to the terminal communication unit 354 and the radio communication terminal 110 (S450). The terminal communication unit 354 and the radio communication terminal 110 acquire the encryption key and the decryption key (S452), and encrypts and decrypts subsequent communication data by using the encryption key and the decryption key. Likewise, the authentication server 160 and the authentication function unit 358 transmit the encryption key and the decryption key to the base station 120 and the base station communication unit 350 (S454). The base station 120 and the base station communication unit 350 acquire the encryption key and the decryption key (S456), and encrypts and decrypts subsequent communication data by using the encryption key and the decryption key.

By using the set encryption key and decryption key, encrypted communication data are transmitted and received, through the communication path between the base station 120 and the terminal communication unit 354, and the communication path between the base station communication unit 350 and the radio communication terminal 110 (S458). However, since the terminal communication unit 354 and the base station communication unit 350 can decrypt the encrypted communication data, non-encrypted communication data are transmitted between the terminal communication unit 354 and the base station communication unit 350 (S460), so that data format can be easily converted.

In the radio communication relay method, even the radio communication terminal 110 through the relay station 130, it is possible to enable the radio communication system 100 to recognize the radio communication terminal 110 as in direct communication, so that it is possible to properly perform communication with the radio communication terminal 110.

A preferred embodiment of the present invention has been described with reference to the accompanying drawings. However, there is no need to say that the present invention is not limited to the embodiment. One of ordinary skill in the art can make various modified and altered embodiments within the scope described in the claims. The modified and altered embodiments are construed as being within the technical scope of the present invention.

The steps in the radio communication relay method described in this specification do not need to be sequentially performed in the order described in the sequence view and may be performed in parallel or by subroutine.

The present invention provides the following embodiments:

(1) A relay station capable of relaying radio communication between a radio communication terminal and a base station, the relay station comprising: a terminal communication unit which performs radio communication with the base station; a base station communication unit which performs radio communication with one or more radio communication terminals; and a data rearrangement unit which rearranges communication data included in a communication band allocated to the radio communication terminal in a communication band allocated to the base station, and rearranges communication data included in a communication band allocated to the base station in a communication band allocated to the radio communication terminal.

According to this configuration, it is possible to transparently transmit communication data from the radio communication terminal without changing contents of the communication data. Also, it is possible to transparently transmit communication data from the base station to the radio communication terminal. Accordingly, even the radio communication terminal through the relay station, it is possible to enable the radio communication system to recognize the radio communication terminal in the same manner as that of direct communication, so that it is possible to properly perform communication with the radio communication terminal.

(2) In the relay station of (1), transmission capacity of the communication band allocated to communication with the base station is not less than a sum of transmission capacities of communication bands allocated to communication with the one or more radio communication terminals.

By securing at least the same transmission capacity as a sum (adding up) of transmission capacities of communication bands allocated to communication with the radio communication terminals, for a communication band allocated to communication with the base station 120, even without changing contents of communication data transmitted from the radio communication terminals or the base station to the relay station, it is possible to transparently transmit the communication data to the base station or the radio communication terminals.

(3) The relay station of (1) or (2), further comprises: an authentication function unit which functions as an authentication server for the radio communication terminal, which decrypts encrypted communication data from the base station and encrypts the decrypted data into communication data, which can be transmitted to the radio communication terminal, and which decrypts encrypted communication data from the radio communication terminal and encrypts the decrypted data into communication data, which can be transmitted to the base station.

An appropriate QoS (Quality of Service) is applied to a communication path between the base station and the terminal communication unit, and a communication path between the base station communication unit and the radio communication terminal, in accordance with the radio wave environment. Accordingly, if communication data are transmitted over the two communication paths, data format conversion between the different QoSs needs to be performed. If an authentication server has been adopted in the radio communication system, the relay station needs to decrypt the communication data once to perform the data format conversion. In the present invention, by providing the authentication function unit functioning as an authentication server in the self-station, it is possible to re-encrypt the communication data after the data format conversion, so that it is possible to properly perform communication of the radio communication terminal, without performing specific processes in the radio communication terminal.

(4) The relay station of (1) to (3), further comprises: a request refusal unit which, when receiving a handover request to a radio communication terminal performing radio communication with the base station communication unit, does not transmit the handover request to the radio communication terminal and make a response indicating the handover is not performed, to the base station.

According to this configuration, the relay station does not need to respond to the current base station and the base station, which is the handover destination, at the same time, thereby avoiding increase of process load and increase of hardware costs resulting from adopting a plurality of high-cost RF circuits.

(5) In the relay station of (1) to (4), radio communication between the radio communication terminal and the base station is performed in an OFDMA system.

Even in the case where the base station communication unit performs radio communication with a plurality of radio communication terminals, if the radio communication uses the OFDMA system, it is possible to properly allocate each communication band to radio communication with the base station through the terminal communication unit. Accordingly, the above-described invention can be accomplished by one RF circuit, so that process load or hardware costs can be reduced.

(6) In the replay station of (1) to (5), the terminal communication unit adaptively changes QoS in accordance with the state of communication with the base station, and the base station communication unit adaptively changes QoS in accordance with the state of communication with the radio communication terminal.

According to this configuration, it is possible to perform communication in accordance with a radio wave environment, between the base station and the relay station, and between the radio terminal and the relay station.

(7) A radio communication relay method for relaying radio communication between a radio communication terminal and a base station, the method comprising performing radio communication with the base station; performing radio communication with one or more radio communication terminals: rearranging communication data included in a communication band allocated to the radio communication terminal in a communication band allocated to the base station, and rearranging communication data included in a communication band allocated to the base station in a communication band allocated to the radio communication terminal.

The components that is described based on the technical concept of the relay station and explanation thereof are applicable to the radio communication relay method described above.

(8) A relay station capable of relaying radio communication between a radio communication terminal and a base station, the relay station comprising: a terminal communication unit which performs radio communication with the base station, and a base station communication unit which performs radio communication with a plurality of radio communication terminals, wherein the base station communication unit allocates a communication band such that a sum of transmission capacities for the plurality of radio communication terminals performing communication therewith becomes equal to a communication capacity of a communication band allocated between the terminal communication unit and the base station.

(9) In the relay station of (8), the terminal communication unit secures a communication band with the base station for each of the radio communication terminals, in accordance with requests from the plurality of radio communication terminals, and the base station communication unit allocates a communication band to each of the radio communication terminals to have the same transmission capacity as that of the communication band secured for each of the radio communication terminals.

(10) The relay station of (8) or (9), further comprises: a data rearrangement unit which rearranges communication data included in a communication band allocated to the radio communication terminal in a communication band allocated to the base station, and which rearranges communication data included in a communication band allocated to the base station in a communication band allocated to the radio communication terminal.

The present invention is based on a Japanese Patent Application No. 2008-214722 filed on Aug. 23, 2008, the disclosure of which is herein incorporated by reference.

INDUSTRIAL APPLICABILITY

The present invention can be used for a relay station capable of relaying radio communication between a radio communication terminal and a base station, and a radio communication relay method.

DESCRIPTION OF REFERENCE NUMERALS

100 . . . radio communication system
110 . . . radio communication terminal

120 . . . base station
130 . . . relay station
160 . . . authentication server
350 . . . base station communication unit
352 . . . connection control unit
354 . . . terminal communication unit
356 . . . data rearrangement unit
358 . . . authentication function unit
360 . . . request refusal unit

The invention claimed is:

1. A relay station capable of relaying radio communication between a radio communication terminal and a base station, the relay station comprising:
   a terminal communication unit which performs radio communication with the base station;
   a base station communication unit which performs radio communication with one or more radio communication terminals; and
   a data rearrangement unit which rearranges communication data included in a communication band allocated to the radio communication terminal in a communication band allocated to the base station, and rearranges communication data included in a communication band allocated to the base station in a communication band allocated to the radio communication terminal, wherein
   the data rearrangement unit tunnels identification information related to one of the radio communications terminals between the base station communications unit and the terminal communication unit, said identification information extracted from a radio communication between the one radio communications terminal and base station communication unit, and
   a transmission capacity of the communication band allocated to communication with the base station is not less than a sum of transmission capacities of communication bands allocated to communication with the one or more radio communication terminals.

2. The relay station according to claim 1, further comprising:
   an authentication function unit which functions as an authentication server for the radio communication terminal, which decrypts encrypted communication data from the base station and encrypts the decrypted data into communication data, which can be transmitted to the radio communication terminal, and which decrypts encrypted communication data from the radio communication terminal and encrypts the decrypted data into communication data, which can be transmitted to the base station.

3. The relay station according to claim 1, further comprising:
   a request refusal unit which, when the terminal communication unit receives, from the base station, a handover request to a radio communication terminal performing radio communication with the base station communication unit, does not transmit the handover request to the radio communication terminal and makes a response indicating the handover is not performed, to the base station.

4. The relay station according to claim 1,
   wherein radio communication between the radio communication terminal and the base station is performed in an OFDMA system.

5. The replay station according to claim 1,
   wherein the terminal communication unit adaptively changes QoS in accordance with the state of communication with the base station, and
   wherein the base station communication unit adaptively changes QoS in accordance with the state of communication with the radio communication terminal.

6. A radio communication relay method for a relay station to relay radio communication between a radio communication terminal and a base station, the method comprising:
   performing radio communication with the base station;
   performing radio communication with one or more radio communication terminals;
   rearranging communication data included in a communication band allocated to the radio communication terminal in a communication band allocated to the base station;
   rearranging communication data included in a communication band allocated to the base station in a communication band allocated to the radio communication terminal; and
   tunneling identification information related to one of the radio communications terminals between the one of the radio communications terminal and the base station, said identification information extracted from a radio communication between the one radio communications terminal and the relay station, wherein
   a transmission capacity of the communication band allocated to communication with the base station is not less than a sum of transmission capacities of communication bands allocated to communication with the one or more radio communication terminals.

7. A relay station capable of relaying radio communication between a radio communication terminal and a base station, the relay station comprising:
   a terminal communication unit which performs radio communication with the base station;
   a base station communication unit which performs radio communication with a plurality of radio communication terminals; and
   a data rearrangement unit which rearranges communication data included in a communication band allocated to the radio communication terminal in a communication band allocated to the base station, and which rearranges communication data included in a communication band allocated to the base station in a communication band allocated to the radio communication terminal,
   wherein the base station communication unit allocates a communication band such that a sum of transmission capacities for the plurality of radio communication terminals performing communication therewith becomes equal to a communication capacity of a communication band allocated between the terminal communication unit and the base station.

8. The relay station according to claim 7,
   wherein the terminal communication unit secures a communication band with the base station for each of the radio communication terminals, in accordance with requests from the plurality of radio communication terminals, and
   wherein the base station communication unit allocates a communication band to each of the radio communication terminals to have the same transmission capacity as that of the communication band secured for each of the radio communication terminals.

* * * * *